United States Patent [19]

Price

[11] Patent Number: 4,751,915
[45] Date of Patent: Jun. 21, 1988

[54] GAS FIRED FRYER AND GAS FIRED BURNER USEFUL THEREFOR

[75] Inventor: George M. Price, Shreveport, La.

[73] Assignee: The Frymaster Corporation, Shreveport, La.

[21] Appl. No.: 550,995

[22] Filed: Nov. 14, 1983

Related U.S. Application Data

[63] Continuation of Ser. No. 264,370, May 18, 1981, abandoned.

[51] Int. Cl.⁴ .............................................. A47I 27/00
[52] U.S. Cl. ...................................... 126/391; 99/403
[58] Field of Search ...................... 126/387, 391, 91 A, 126/366, 276, 376, 360 R, 343.5 R, 343.5 A, 19.5; 99/403; 122/50, 44 A, 116, 23

[56] References Cited

U.S. PATENT DOCUMENTS

| | | | |
|---|---|---|---|
| 1,264,740 | 4/1918 | Young. | |
| 1,620,952 | 3/1927 | Davies | 126/343.5 A |
| 2,025,687 | 12/1935 | Kemp | 126/343.5 A |
| 2,055,949 | 9/1936 | Sharp | 126/343.5 A |
| 2,109,212 | 2/1938 | Ehrgott | 99/331 |
| 2,176,869 | 10/1939 | Childs | 126/343.5 A |
| 2,243,661 | 5/1941 | Tota. | |
| 2,251,111 | 7/1941 | Brown | 126/391 X |
| 2,429,360 | 10/1947 | Kells | 126/391 |
| 2,452,472 | 10/1948 | Keating | 126/391 |
| 2,543,835 | 3/1951 | Dewey | 126/350 R |
| 2,548,177 | 4/1951 | Tauber | 126/343.5 |
| 2,655,144 | 10/1953 | Keating | 126/391 |
| 2,912,975 | 11/1959 | Del Francia | 126/391 |
| 3,060,922 | 10/1962 | Wilson | 126/391 |
| 3,273,488 | 9/1966 | Anetsberger | 99/407 |
| 3,537,443 | 11/1970 | Becker | 126/343.5 A |
| 3,577,976 | 5/1971 | Heller | 126/343.5 A |
| 3,970,072 | 7/1976 | Chipchase. | |

Primary Examiner—Randall L. Green
Attorney, Agent, or Firm—Hubbard, Thurman, Turner & Tucker

[57] ABSTRACT

In a fryer, a conduit extends through a frypot so as to be immersed in a frying oil. Combustion occurs in an inlet portion of the conduit. Products of combustion are exhausted through an outlet portion of the conduit and through serpentine channels along certain walls of the frypot. Insulative panels form outer walls of the channels. In a burner for the fryer, a vortex of air is provided, and a minor portion of gas is ignited before a valve controlling a major portion of gas is opened. Means provide a minimum delay of one to three seconds, when it has been sensed that combustion has been established, before the valve is opened.

6 Claims, 4 Drawing Sheets

GAS FIRED FRYER AND GAS FIRED BURNER USEFUL THEREFOR

This application is a continuation of application Ser. No. 264,370, filed May 18, 1981, now abandoned.

BACKGROUND OF THE INVENTION

This invention pertains to a gas-fired fryer of a type used in restaurants and elsewhere to fry fish, poultry, potatoes, and foods of other kinds in a frypot containing a frying oil. This invention also pertains to a gas-fired burner, in which gas to be burned is injected into a vortex of air, of a type useful for a gas-fired fryer.

As exemplified in U.S. Pat. Nos. 2,429,360, 2,452,472, 2,655,144, and 2,712,308, one type of gas-fired fryer employs tubular heaters, which are mounted within the frypot, so as to be immersed in the frying oil. Heat is transferred efficiently from the heaters to the frying oil in the frypot. However, such heaters tend to become fouled with burnt-on residues and to be difficult to clean. Typically, such heaters comprise several tubular elements, which are crowded in lower portions of the frypot. Typically, such a fryer has a lower zone, in which particles of food and breading tend to collect, which is unheated, so as to avoid scorching of particles collected therein, and which tends to be difficult to clean when spanned by such tubular elements.

Gas-fired fryers of related interest are examplified in U.S. Pat. Nos. 2,251,111, 3,313,288, 3,970,072, 3,990,433, and 4,228,730. Gas-fired devices of related interest but for other uses are exemplified in U.S. Pat. Nos. 2,185,594, 2,465,953, 3,554,182, and 4,014,316.

Also, another type of gas-fired fryer employs gas-fired heaters mounted beneath but outside the frypot, so as to facilitate cleaning of the frypot, which thus can be free of internal tubular structures tending to become fouled with burnt-on residues and to be difficult to clean. However, particles of food and breading tend to collect on and to be burnt onto heated lower portions of the frypot.

U.S. Pat. No. 4,091,801 discloses such a fryer, in which heat is transferred to the frying oil in the frypot via a vaporized fluid. U.S. Pat. No. 3,964,378 disclosed another type of gas-fired device of related interest.

As exemplified in U.S. Pat. Nos. 3,809,062, 3,938,948, and 3,948,593, another type of gas-fired fryer employs gas-fired burners adjacent to lateral walls of a lower portion of the frypot. Heat is transferred efficiently from the burners to the frying oil in the frypot through such walls, which are oriented vertically where adjacent to the burners, so as to minimize horizontal surfaces tending to allow boundary layers of hot frying oil to form along such surfaces.

Gas-fired burners of the type mentioned above are exemplified in numerous references including U.S. Pat. Nos. 2,539,165, 2,565,879, 2,787,318, 3,630,651, 4,124,353, and 4,224,019.

Against a background of increased costs of gaseous fuels in recent years, gas-fired fryers employing gas-fired burners of high efficiency are expected to displace less efficient fryers in restaurants and elsewhere.

Additionally, it is known for flow of gas to a main burner to be delayed by suitable means for a minimum delay after combustion has been established at a pilot burner, in a furnace wherein air is drawn into the burner by a partial vacuum created in the furnace, and wherein air and gas to be burned are mixed at each such burner.

However, such means do not seem to have been used heretofore in a burner wherein air and gas to be burned are mixed in a vortex of air, and wherein the vortex of air is provided from air delivered to the burner at low pressure, which may be as low as 1.5 inches of water.

SUMMARY OF THE INVENTION

This invention pertains to an improvement in a fryer for foods, of a type comprising a frypot, which has side walls and end walls, which is adapted to contain a frying oil, and to receive foods to be fried in the frying oil, a burner, which is mounted to the frypot, and which is adapted to deliver gas being a fuel and air for combustion, and a conduit, which extends through the frypot, so as to be immersed in the frying oil, and which has an inlet portion reaching one end wall and wherein combustion occurs and an outlet portion reaching another end wall and wherein products of combustion are exhausted.

This invention provides an improvement wherein the frypot is provided with outer channels, which are arranged to conduct products of combustion from the outlet portion of the conduit along outer surfaces of the end wall reached by the outlet portion of the conduit and along outer surfaces of the side walls, so as to transfer heat from products of combustion in the channels, through the end wall reached by the outlet portion of the conduit and through the side walls, to the frying oil in the frypot, and wherein the channels terminate in respective outlets for products of combustion.

Preferably, the frypot has respective panels of thermal insulation covering the side walls and the end wall nearer to the outlet portion of the conduit and forming outer walls of the channels, so as to limit loss of heat from the channels. Preferably, the channels at the side walls have lower courses and upper courses, so as to provide serpentine paths for products of combustion between the conduit and the outlets.

In one arrangement, the lower courses communicate with the outlet portion of the conduit through the channels at the end wall reached by the outlet portion of the conduit so as to receive products of combustion from the conduit, and the lower courses communicate with the upper courses near the end wall reached by the inlet portion of the conduit so as to exhaust products of combustion, whereupon the upper courses may be smaller than the lower courses in overall cross-section. In another arrangement, the upper courses communicate with the outlet portion of the conduit through the channels at the end wall reached by the outlet portion of the conduit so as to receive products of combustion from the conduit, and the lower courses communicate with the upper courses near the end wall reached by the inlet portion of the conduit, whereupon the lower courses may be smaller than the upper courses in overall cross-section. Preferably, the inlet portion of the conduit is circular in cross-section, the outlet portion of the conduit is elongated vertically in cross-section, and the conduit has a transitional portion between the inlet portion and the outlet portion.

This invention also provides, for a gas-fired fryer or other gas-fired apparatus, a novel burner comprising an enclosure, which has a cylindrical wall having a central axis, which has a flat wall closing one end of the cylindrical wall, and which has an outlet opening axially opposite to the flat wall, a conduit, which is mounted to the enclosure so as to intrude the enclosure through a slot in the cylindrical wall, and so as to extend tangentially into the enclosure, and which is adapted to be connected to a source of air at superatmospheric pressure so as to produce a vortex of air around the central axis within the enclosure, a manifold, which has lateral outlets, which is mounted to the enclosure so as to intrude the enclosure through an aperture in the flat wall, and so as to extend axially across the conduit within the enclosure, and which is adapted to be connected to a source of gas being a fuel at superatmospheric pressure so as to inject a major portion of gas from the source of gas into a vortex of air within the enclosure, an injector, which is mounted to the enclosure so as to intrude the enclosure through an aperture in the flat wall, and which is adapted to be connected to the source of gas so as to inject a minor portion of gas from the source of gas into the enclosure, a valve, which is connected to the manifold so as to control flow of the major portion of gas to the manifold, means to initiate combustion within the enclosure, to sense when combustion has been established within the enclosure, and to cause the valve to be opened when it thus has been sensed that combustion has been established within the enclosure, and means to delay opening of the valve for a minimum delay of approximately from one to three seconds after it thus has been sensed that combustion has been established within the enclosure, whereby air can be provided to the enclosure at a pressure within the conduit as low as approximately 1.5 inches of water, without backfiring, without shuddering, and without failure of ignition after the valve has been opened.

Preferably, the manifold and the injector are connected to the source of gas so as to cause the minor portion of gas to provide approximately from one-eighth to one-fourth of total calorific value of the major and minor portions of gas. Preferably, the source of gas provides gas at a rate causing total calorific value of the major and minor portions of gas to be approximately 40,000 BTU per hour, and the source of air provides air at a rate of approximately 450 standard cubic feet per hour.

Preferably, a curved deflector is mounted within the enclosure so as to deflect the vortex helically toward the central axis. Preferably, the injector is located so as to inject the minor portion of gas into the vortex where the vortex is deflected by the deflector. Preferably, the means to ignite gas within the enclosure is located so as to initiate combustion near the central axis.

These and other objects, features, and advantages of this invention are evident from the following description of preferred embodiments of this invention.

DETAILED DESCRIPTION OF PREFERRED EMBODIMENTS

As shown in FIGS. 1 through 4, a fryer 10 of a type used in restaurants and elsewhere to fry fish, poultry, potatoes, and foods of other kinds comprises a frypot 20, which comprises a shell 22 and other components to be described below, and which is adapted to contain a frying oil (not shown) in the shell 22 and to receive goods (not shown) to be fried in the frying oil. Also, the fryer 10 comprises a burner 30, which is associated with a blower 32, and which is mounted to the frypot 20. Foods may be introduced in a basket (not shown) of conventional type. The frypot 20 and the burner 30 may be mounted in a cabinet (not shown) of conventional type.

The shell 22, which may be fabricated of suitable stainless steel with welded seams, and with rounded interior corners for ease of cleaning, has opposite end walls 40, 42, opposite side walls 44, 46, and a bottom wall 48. Plural studs 50, which mount the burner 30 in a manner to be described below, are welded to the end wall 40 in a circular array around a circular aperture 52 in the end wall 40. The end wall 42 has a rectangular aperture 54 in an opposite location.

An elongated conduit 60, which is fabricated of suitable stainless steel, extends through the frypot 20 between the end walls 40, 42, so as to be immersed in the frying oil when the frypot 20 is charged with a sufficient quantity of the frying oil for normal frying operation. The conduit 60 has an inlet portion 62, in which combustion occurs, and an outlet portion 64, in which products of combustion are exhausted. The inlet portion 62, which reaches the end wall 40, is cylindrical so as to be circular in cross-section, whereby there is adequate volume for combustion to occur in the inlet portion 62. The outlet portion 64, which reaches the end wall 42, is rectangular and oriented so as to be elongated vertically in cross-section, whereby transfer of heat from products of combustion in the outlet portion 64 to the frying oil in the frypot 20 is promoted as the frying oil tends to circulate in convection along vertical surfaces of the outlet portion 64. A transitional portion 66 connects the inlet portion 62 and the outlet portion 64. An inlet end 72 of the inlet portion 62 is welded marginally around the aperture 52. An outlet end 74 of the outlet portion 64 is flared laterally (as shown) and welded marginally around the aperture 54.

The side wall 44 is embossed so as to be formed as a mirror image of the side wall 46 and with a channel 92, which protrudes inwardly, and which has a lower course 94 and an upper course 96. A rib 98, which is formed in the side wall 44, separates the lower course 94 and the upper course 96, except where the upper course 96 communicates with the lower course 94 near the end wall 40. A panel 100 of thermal insulation is clamped against the side wall 44 by suitable clamping means (not shown) so as to provide an outer wall for the channel 92, and so as to minimize loss of heat from the channel 92, which thus does not have an outer, metal wall.

The side wall 46 is embossed so as to be formed as a mirror image of the side wall 44 and with a channel 112, which is similar to the channel 92, which thus protrudes inwardly, and which thus has a lower course 114 and an upper course 116. A rib 118, which is formed in the side wall 46, separates the lower course 114 and the upper course 116, except where the upper course 116 communicates with the lower course 114 near the end wall 40. A panel 120 of thermal insulation is clamped against the side wall 46 by suitable clamping means (not shown) so as to provide an outer wall for the channel 112, and so as to minimize loss of heat from the channel 112, which thus does not have an outer, metal wall.

A panel 140 of thermal insulation is clamped against the end wall 42 by suitable clamping means (not shown) and is fabricated so as to provide further channels 142, which conduct products of combustion from the outlet portion 64 of the conduit 60 both to the upper course 96 of the channel 92 and to the upper course 116 of the channel 112. The panel 140 closes the adjacent end of the lower course 94 of the channel 92, except for an outlet provided by a conduit 146, which passes through a suitable aperture in the panel 140 so as to communicate with the lower course 94, and so as to exhaust products of combustion. The panel 140 closes the adjacent end of the lower course 114 of the channel 112, except for an outlet provided by a conduit 156, which passes through a suitable aperture in the panel 140 so as to communicate with the lower course 114, and so as to exhaust products of combustion. The conduits 146, 156, are broken away in FIGS. 1, 2, and 4.

The panels 100, 120, and 140, which are considered to be components of the frypot 20, may be made of conventional, rigid, ceramic fiber, which is available from various commercial sources. The clamping means for the panels 100, 120, and 140 may be an enclosure (not shown) of sheet metal.

In the frypot 20 of FIGS. 1 through 4, products of combustion are hottest in the conduit 60, intermediate in temperature in the upper courses 96, 116, and coolest in the lower courses 94, 114, whereby it is expected that transfer of heat from products of combustion to the frying oil in the frypot 20 thus can be maximized.

Figure 1:
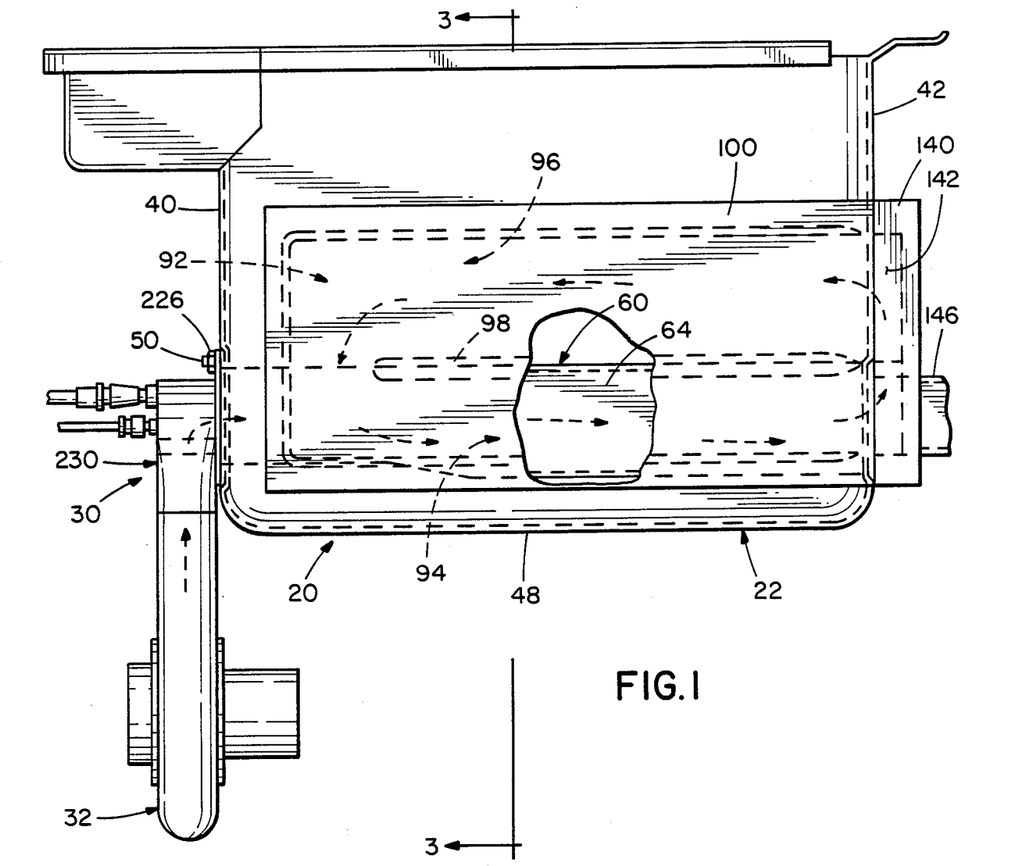
FIG. 1 is an elevational view of one possible construction of a fryer embodying this invention.
Figure 2:
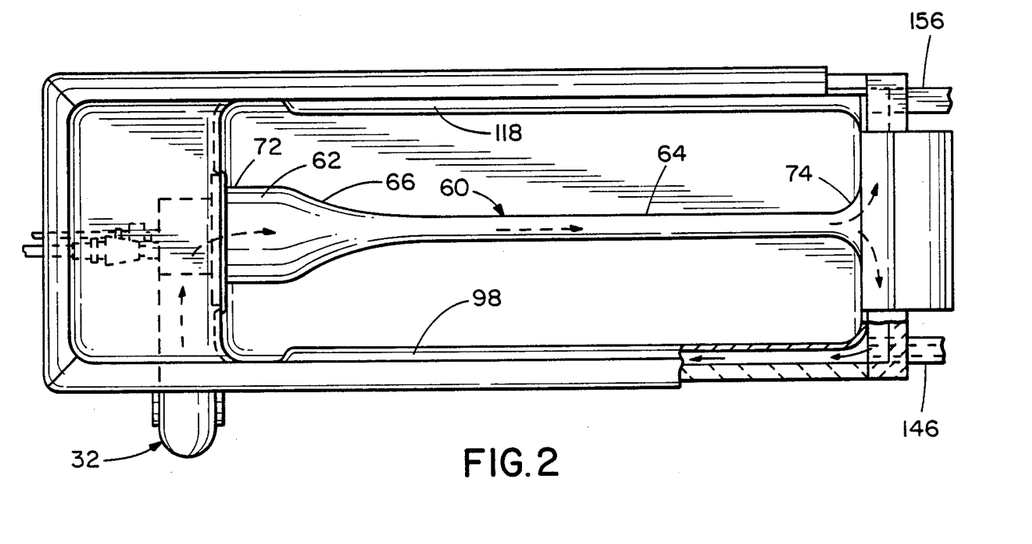
FIG. 2 is a top, plan view of the fryer of FIG. 1.
Figure 3:
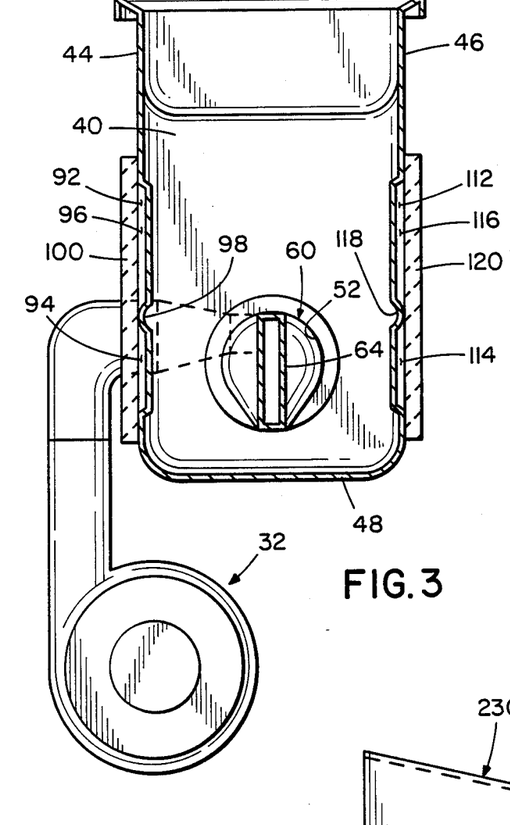
FIG. 3 is a sectional view taken along line 3—3 of FIG. 1 in a direction indicated by arrows.
Figure 4:
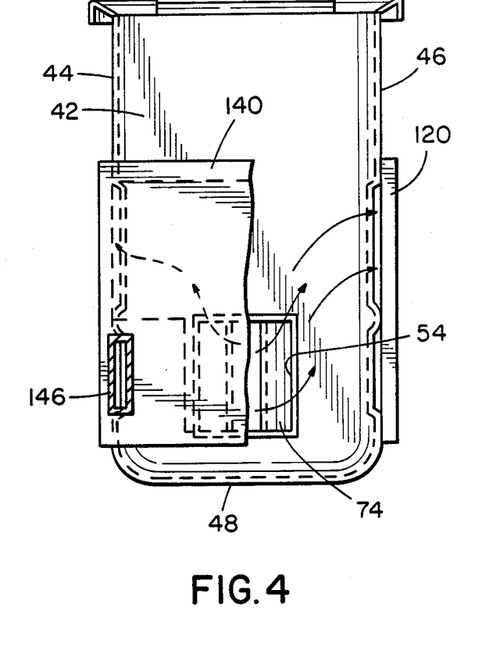
FIG. 4 is an elevational view taken from one end of the fryer of FIG. 1 in the same direction.
Figure 5:
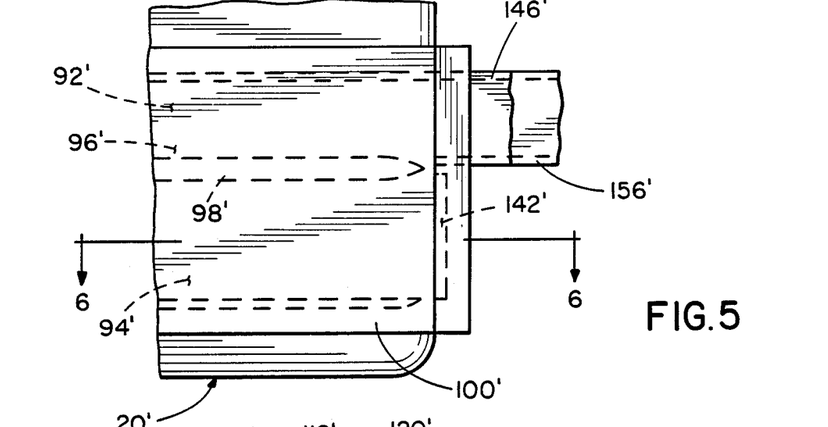
FIG. 5 is a fragmentary view, which is similar to FIG. 1, but which shows an alternative construction for a fryer embodying this invention.
Figure 6:
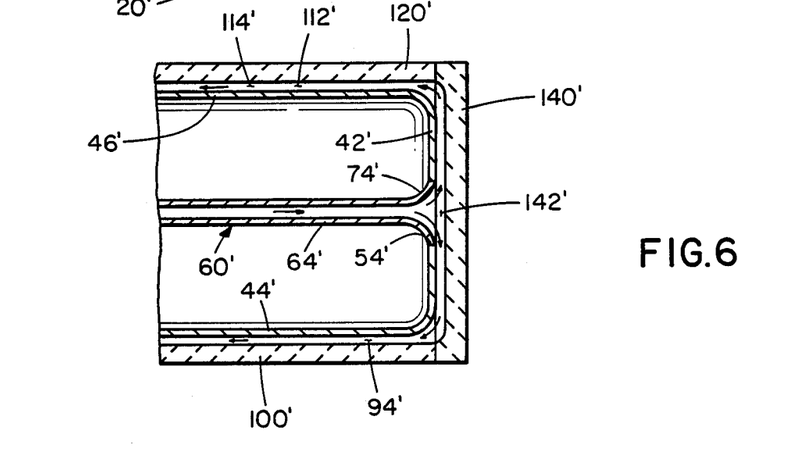
FIG. 6 is a sectional view taken along line 6—6 of FIG. 5 in a direction indicated by arrows. Elements indicated by primed reference numbers in FIGS. 5 and 6 are similar, except as described herein, to elements indicated by like unprimed numbers in FIGS. 1 through 4.

As shown in FIGS. 1, 3, and 4, the lower courses 94, 114, are smaller than the upper courses 96, 116, in overall cross-section, so as to accelerate products of combustion as products of combustion cool in the channels 92, 112. Similarly, the upper courses 96, 116, are smaller than the outlet portion 64 of the conduit 60, in overall cross-section As shown in FIGS. 5 and 6, a frypot 20' is similar to the frypot 20, except as described below. An elongated conduit 60', which is similar to the conduit 60, is associated similarly with the frypot 20'. Thus, an outlet end 74' of an outlet portion 64' of the conduit 60' is flared laterally (as shown) and welded marginally around an aperture 54', which is provided in an end wall 42' of the frypot 20'.

A side wall 44' of the frypot 20' is embossed so as to be formed as a mirror image of a side wall 46' and with a channel 92', which thus protrudes inwardly and which thus has a lower course 94' and an upper course 96'. A rib 98', which is formed in the side wall 44', separates the lower course 94' and the upper course 96', except where the upper course 96' communicates with the lower course 94' near an end wall (not shown) opposite to the end wall 42'. A panel 100', which is similar to the panel 100, is clamped against the side wall 44' by suitable clamping means (not shown) so as to provide an outer wall for the channel 92', and so as to minimize loss of heat from the channel 92', which thus does not have an outer, metal wall.

Figure 11:
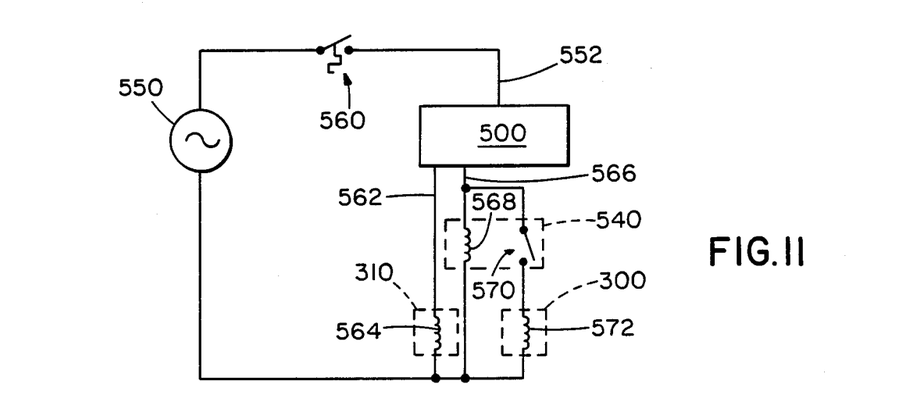
FIG. 11 is an electrical diagram associated with the arrangement of FIG. 9.

The side wall 46' of the frypot 20' is embossed so as to be formed as a mirror image of the side wall 44' and with a channel 112', which is similar to the channel 92'. A lower course 114' of the channel 112' is shown in FIG. 11. A panel 120', which is similar to the panel 120, is clamped against the side wall 46' by suitable clamping means (not shown) so as to provide an outer wall for the channel 112', and so as to minimize loss of heat from the channel 112', which thus does not have an outer, metal wall.

A panel 140' of thermal insulation, as used for the panel 140, is clamped against the end wall 42' by suitable clamping means (not shown) and is fabricated to provide further channels 142', which conduct products of combustion from the outlet portion 64' of the conduit 60' both to the lower course 94' of the channel 92' and to the lower course 114' of the channel 112'. The panel 140' closes the adjacent end of the upper course 96' of the channel 92', except for an outlet provided by a conduit 146', which passes through a suitable aperture in the panel 140' so as to communicate with the upper course 96', and so as to exhaust products of combustion. The panel 140' closes the adjacent end of the upper course (not shown) of the channel 112', except for an outlet provided by a conduit 156', which passes through a suitable aperture in the panel 140' so as to communicate with the upper course of the channel 112', and so as to exhaust products of combustion. The conduits 146', 156', are broken away in FIG. 10.

In the frypot 20' of FIGS. 5 and 6, products of combustion are hottest in the conduit 60', intermediate in temperature in the lower courses 94', 114', and coolest in the upper courses of the channels 92', 112', whereby risks of scorching of the frying oil at its upper surface can be minimized, even if the frying oil is depleted so as to expose inner surfaces of the side walls 44', 46', near the channels 92', 112'.

As shown in FIGS. 5 and 6, the upper course 96' is smaller than the lower course 94', and it is to be understood that the upper course of the channel 112' is smaller than the lower course 114', in overall cross-section, so as to accelerate products of combustion as products of combustion cool in the channels 92', 112'. Similarly, although not shown, the lower courses of the channels 92', 112', may be smaller than the outlet portion 64' of the conduit 60', in overall cross-section.

Figure 7:
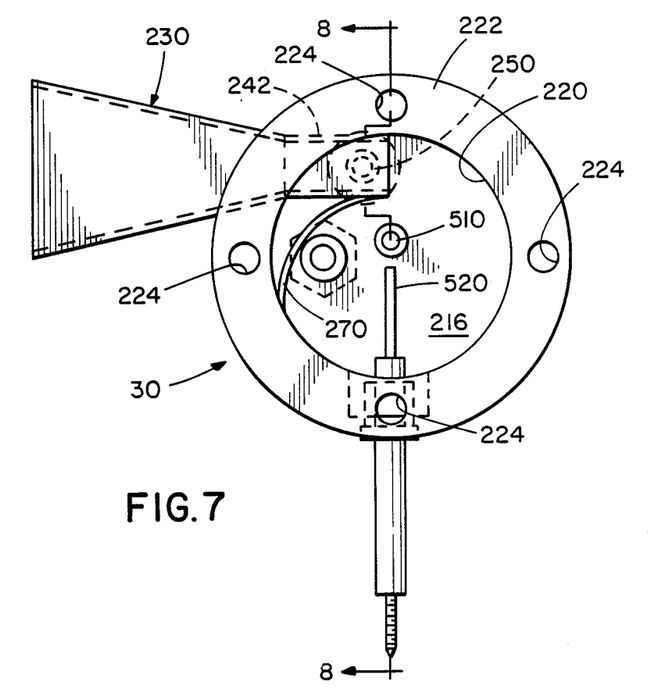
FIG. 7 is an enlarged, elevational view of a burner used in the fryer of FIG. 1, as removed from a frypot and other components of the fryer, and as viewed from one end of the burner.

The burner 30 comprises an enclosure 210, which has a cylindrical wall 212 having a central axis, which has a flat wall 216 closing one end of the cylindrical wall 212, and which has a circular outlet 220 opening axially opposite to the flat wall 216. An annular flange 222, which is joined integrally to the cylindrical wall 212 so as to surround the outlet 220, has a circular array of suitable holes 224 receiving the studs 50 so as to mount the burner 30 to the end wall 40 of the frypot 20. The studs 50, which are threaded, receive threaded nuts 226 so as to secure the burner 30 to the frypot 20. In FIG. 1, one of the studs 50 and one of the nuts 226 are shown. When the burner 30 is mounted to the frypot 20, the outlet 220 communicates with the aperture 52 in the end wall 40, whereupon the inlet portion 62 of the conduit 60 and the enclosure 210 provide an elongated, cylindrical chamber, wherein combustion occurs.

A conduit 230, which is mounted suitably to the enclosure 210, is connected to the blower 32, which constitutes a source of air under superatmospheric pressure. The conduit 230, which tapers to a constricted throat 242 of rectangular shape in lateral cross-section, intrudes the enclosure 210 through a wide rectangular slot so as to extend tangentially into the enclosure 210. When the blower 32 is operated, a vortex of air thus is produced around the central axis, within the enclosure 210.

A manifold 250, which is tubular and perforated, is mounted to the enclosure 210 so as to intrude the enclosure 210 through an aperture in the wall 216, and so as to extend axially across the constricted throat 242 of the conduit 230 within the enclosure 210. The manifold 250 is connected to a source of gas being a fuel at superatmospheric pressure, via suitable connectors 252, a conduit 254, and other components to be described below, so as to inject a major portion of gas from the source of gas into the vortex of air within the enclosure 210. A minor portion of gas from the source of gas is injected separately in a manner to be described below. The source of gas is indicated schematically at G in FIGS. 9 and 10.

An injector 260, which is tubular, is mounted to the enclosure 210 so as to intrude the enclosure 210 through an aperture in the wall 216. As shown in FIG. 1, the injector 260 has a threaded end being threaded through the aperture, which is to be understood also to be threaded. The injector 260 is connected to the source of gas, via a connector 262, a conduit 264, and other components to be described below, so as to inject the minor portion of gas from the source of gas into the enclosure 210. A curved deflector 270 is mounted within the enclosure 210 so as to deflect the vortex of air within the enclosure helically toward the central axis. The injector 260 is located so as to inject the minor portion of gas into the vortex where the vortex is deflected by the deflector 270.

Figure 9:
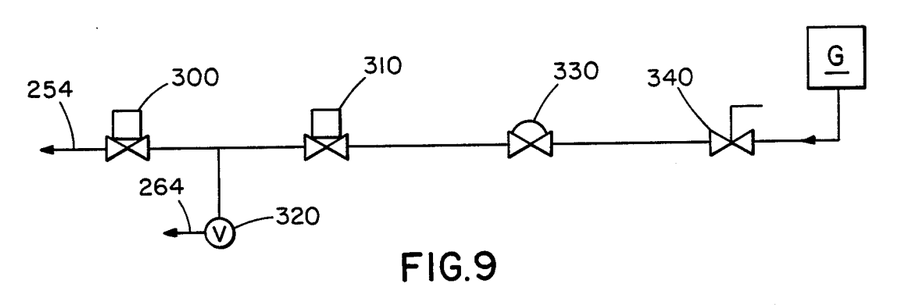
FIGS. 9 and 10 are schematic diagrams of alternative arrangements of valves for use in the fryer of FIG. 1.

In one arrangement, which is shown in FIG. 9, a solenoid valve 300 is connected at its outlet to the manifold 250, via the conduit 254 and the connectors 252, so as to control flow of the major portion of gas to the manifold 250. A solenoid valve 310 is connected at its outlet to the inlet of the solenoid valve 300. The solenoid valve 310 also is connected at its outlet to the injector 260, via a needle valve 320, the conduit 264, and the connector 262, so as to control flow of the minor portion of gas to the injector 260. Relative proportions of the major and minor portions of gas are set manually by the needle valve 320. The solenoid valve 310 is connected at its inlet, via a pressure regulator 330 and a manual valve 340, to the source G of gas. A fixed orifice (not shown) may be substituted for the needle valve 320.

The solenoid valve 300, the solenoid valve 310, the needle valve 320, the pressure regulator 303, and the manual valve 340 are available in a prepackaged combination, as Series G53 Redundant Combination Gas Valve with Manual Shutoff "A" Valve, from Johnson Controls, Inc., Control Products Division, 2221 Camden Court, Oak Brook, Ill. 60521. Bulletin No. 4434 of Johnson Controls, Inc., describes the prepackaged combination, which typically is used with electric ignition in various types of furnaces.

Figure 10:
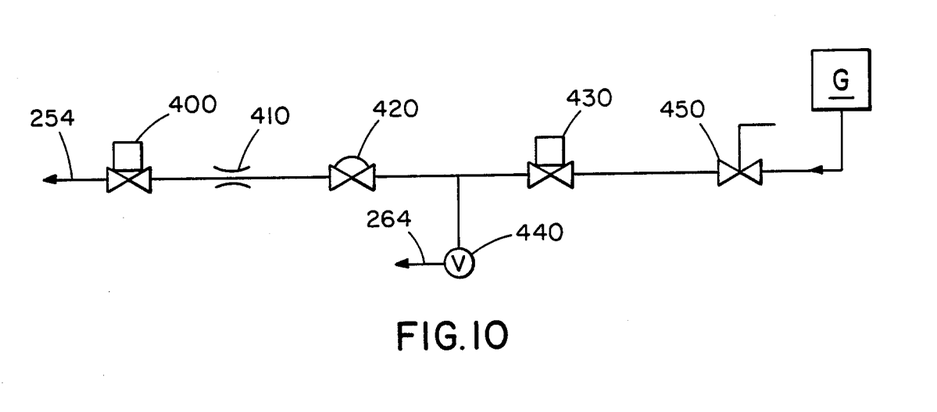

In another arrangement, which is shown in FIG. 10, a solenoid valve 400 is connected at its outlet to the manifold 250, via the conduit 254 and the connectors 252, so as to control flow of the major portion of gas to the manifold 250. The solenoid valve 400 is connected at its inlet, via a delayed-opening means 410, to the outlet of a pressure regulator 420, which is connected at its inlet to the outlet of a solenoid valve 430. The solenoid valve 430 also is connected at its outlet to the injector 260, via a needle valve 440, the conduit 264, and the connector 262, so as to control flow of the minor portion of gas to the injector 260. Relative proportions of gas are set manually by the needle valve 440. The solenoid valve 430 is connected, via a manual valve 450, to the source G of gas. The delayed-opening means 410, which restricts flow of gas from the pressure regulator 420 to the solenoid valve 400, delays opening of the solenoid valve 400 for an adjustable delay after opening of the solenoed valve 400. It is to be adjusted for a minimum delay of approximately from one to three seconds for purposes of this invention. A fixed orifice (not shown) may be substitutes for the needle valve 440.

A prepackaged combination, which is equivalent to the solenoid valve 400, the delayed-opening means 410, the pressure regulator 420, the solenoid valve 430, the needle valve 440, and the manual valve 450, is available as Unitrol 7000 BDER Combination Automatic Gas Valve, from Robertshaw Controls Co., Grayson Controls Division, 100 W. Victoria St., Long Beach, Calif. 90805.

Figure 8:
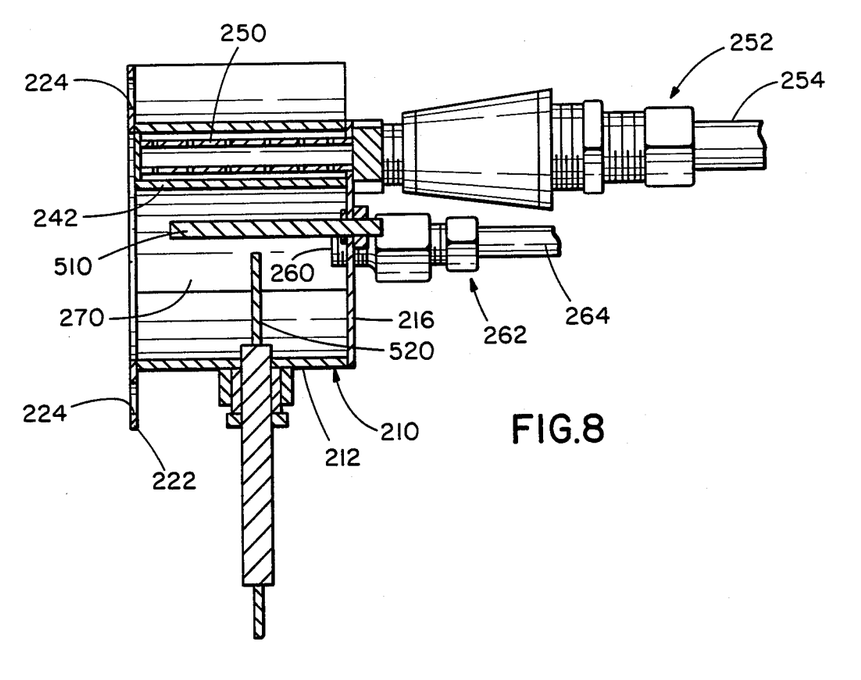
FIG. 8 is a sectional view taken along line 8—8 of FIG. 5 in a direction indicated by arrows.

The burner 30 comprises an electrical, intermittent, proven-pilot, ignition means 500 of a conventional type, which is used to initiate combustion, to sense when combustion has been established, and to open a valve when it thus has been sensed that combustion has been established, and which is available, as Fenwal 05-20 Ignition System, from Walter Kidde & Co., Inc., Fenwal Electronics Division, 63 Fountain St., Framingham, Mass. 01701. The means 500 comprises a sparking and sensing electrode 510, which intrudes the enclosure 210 through an aperture in the wall 216, and which is parallel to but spaced from the central axis of the wall 212, and a grounding rod 520, which intrudes the enclosure 210 through an aperture in the wall 212, and which extends in perpendicular relation to the electrode 510 so as to leave a small gap between its distal end and the electrode 510. The means 500 is connected so as to initiate combustion within the enclosure 210, to sense when combustion has been established within the enclosure 210, and to cause either the solenoid valve 300 of the arrangement of FIG. 7 or the solenoid valve 400 of the arrangement of FIG. 8 to be opened when it thus has been sensed that combustion has been established within the enclosure 210. If the arrangement of FIG. 7 is used, the means 500 is connected in the electrical circuit of FIG. 11, wherein a time-delay relay 540 is connected so as to delay opening of the solenoid valve 300 for a minimum delay of approximately from one to three seconds after it has been sensed by the means 500 that combustion has been established within the enclosure 210. If the arrangement of FIG. 8 is used, the delayed-opening means 410 delays opening of the solenoid valve 400 for an equivalent delay.

In the electrical circuit of FIG. 11, the means 500 is connected so as to be energized from a source 550 of electrical power at 24 VAC, 60 Hz. The means 500 has an electrical input 552, which is connected to the source 550 via an operating thermostat 560, an electrical output 562, which is connected to the operating coil 564 of the solenoid valve 310, and an electrical output 566, which is connected to the operating coil 568 of the time-delay relay 540. The contacts 570 of the time-delay relay 540 are connected between the electrical output 566 and the operating coil 572 of the solenoid valve 300. Thus, if the manual valve 340 is opened, and if the blower 32 is operated, the means 500 opens the solenoid valve 310 and produces a spark in the small gap between the electrode 510 and the rod 520 so as to initiate combustion within the enclosure 210. When the means 500 senses that combustion has been established, the means 500 energizes the time-delay relay 540, which closes its contacts 570 so as to open the solenoid valve 300 after the minimum delay of approximately from one to three seconds. The operating thermostat 560, which may be of any suitable type, is mounted suitably in the frypot so as to sense a temperature within the frypot, as a protection against overheating.

If the arrangement of FIG. 10 is used, a similar circuit is used wherein the time-delay relay 540 is omitted, wherein the electrical output 562 of the means 500 is connected to the operating coil of the solenoid valve 430, and wherein the electrical output 566 of the means 500 is connected to the operating coil of the solenoid valve 400. Thus, if the manual valve 450 is opened, and if the blower 32 is operated, the means 500 opens the solenoid valve 430 and produces a spark in the small gap between the electrode 510 and the rod 520 so as to initiate combustion within the enclosure 210. When the means 500 senses that combustion has been established, the means energizes the solenoid valve 400, which opens after the minimum delay of approximately from one to three seconds, the minimum delay being attributable to the delayed-opening means 410.

The burner 30 may be constructed with an internal diameter of 2.0 inches for the enclosure 210, an internal length of 1.75 inches and an internal width of 0.40 inch for the throat 242, a spark gap of 0.125 inches, twelve perforations of a diameter of 0.062 inch each in the manifold 250, an outer diameter of 0.25 inch for the manifold 250, spacing of 0.57 inch between the central axis of the enclosure 210 and a central axis of the injector 260, and shaping of the deflector 270 as a cylindrical wall having a diameter of 1.75 inches, all dimensions being approximate.

For efficient operation in the fryer 10 when the burner 30 has the dimensions stated in the preceding paragraph, the blower 32 is arranged so as to provide air to the enclosure 210 at a pressure reduced in the constricted throat 242 from 3.5 to 1.5 inches of water (0.0541 psig) and at a rate of 450 standard cubic feet per hour, whereupon the source of gas and the valves controlling flow of gas from the source of gas to the manifold and to the injector are arranged so as to provide total calorific value (of the major and minor portions of gas) of approximately 40,000 BTU per hour, and so as to cause the minor portion of gas to provide approximately from one-eighth to one-fourth of such calorific value. It is to be noted that natural gas, manufactured gases, and other fuels in gaseous form provide different calorific values per standard cubic foot.

Accordingly, the burner 30 can be operated efficiently in the fryer 10 without backfiring, without shuddering, and without failure of ignition after the valve controlling flow of the major portion of gas has been opened.

I claim:

1. A fryer apparatus for cooking foods comprising:
a frypot formed by opposed outer side walls, opposed end walls, and a bottom wall forming an interior chamber for holding a quantity of cooking oil and for receiving relatively large quantities of foodstuffs under sudden cooking loads;
means defining a substantially enclosed combustion chamber and means for burning a gaseous fuel-air mixture in said combustion chamber to produce heated combustion gases;
means including portions of at least one of said side walls and at least one of said end walls forming enclosed heat exchanger channel means in communication with said combustion chamber for conducting said heated combustion gases, said heat exchanger channel means including an upper course extending along an upper portion of at least one of said side walls and a lower course extending along a lower portion of said one side wall for conducting combustion gases, the cross-sectional flow area of one of said courses being less than the cross-sectional flow area of the other of said courses to maintain said combustion gases flowing through said heat exchanger channel means in maximum heat exchange relationship with cooking oil in said interior chamber through said portions of said walls; and
a pressurized combustion system including a combustion air blower for charging said combustion chamber with combustion air at a pressure greater than atmospheric pressure and fuel injector means for injecting pressurized fuel into said combustion chamber means to produce a fuel-air mixture at superatmospheric pressure, said combustion system being operable to force combustion gases through said heat exchanger channel means whereby the forced flow of combustion gases provided by said blower in combination with the configuration of said heat exchanger channel means overcomes resistance to flow of said combustion gases through said heat exchanger channel means and provides for maximizing heat transfer between said combustion gases and said cooking oil under said sudden cooking loads.

2. The apparatus set forth in claim 1 wherein:
the course having the lesser cross-sectional flow area is disposed downstream of the other course in the direction of flow of combustion gases through said heat exchanger channel means to maintain a relatively high velocity of said combustion gases through said heat exchanger channel means as said combustion gases give up heat to said cooking oil.

3. The apparatus set forth in claim 1 wherein:
said one side wall includes embossed areas forming in part said upper and lower courses of said heat exchanger channel means, and said apparatus includes an insulative panel disposed against said one side wall and covering said embossed areas to define said courses of said heat exchanger channel means.

4. The apparatus set forth in claim 1 wherein:
said heat exchanger channel means including said one end wall further includes an insulative panel covering said one end wall and defining with said one end wall a portion of said heat exchanger channel means.

5. The apparatus set forth in claim 1 wherein:

said combustion chamber is formed in an elongated conduit extending through a lower portion of said interior chamber between said end walls.

6. A fryer apparatus for cooking food comprising:

a frypot including opposed longitudinal side walls, opposed end walls and means forming a bottom wall and defining an interior chamber for holding a quantity of cooking oil and for receiving relatively large quantities of foodstuffs under sudden cooking load conditions;

at least portions of said side walls and at least one of said end walls defining multiple pass heat exchanger channels extending along said side walls and said end walls for conducting combustion gases in heat exchange relationship with said cooking oil;

means forming an enclosed combustion chamber and means for burning air pressurized fuel-air mixture in said combustion chamber, said combustion chamber being in communication with said heat exchanger channel means for conducting a forced flow of combustion gases through said heat exchanger channel means; and air blower means disposed in air flow communication with an inlet of said combustion chamber for charging said combustion chamber with pressure air to mix with pressure gaseous fuel to provide combustion and forced flow of resulting combustion gases through said combustion chamber and said heat exchanger channel means to provide maximum heat transfer to said cooking oil under said sudden cooking loads and to overcome combustion gas flow resistance in said heat exchanger channel means.

* * * * *